Patented Aug. 10, 1943

2,326,190

UNITED STATES PATENT OFFICE 2,326,190

PROCESS FOR THE PREPARATION OF LAMINATING FABRICS

William Whitehead, Rye, N. Y., assignor to Celanese Corporation of America, a corporation of Delaware No Drawing. Application May 11, 1940, Serial No. 334,614

5 Claims. (Cl. 8—131)

This invention relates to the production of composite fabrics, and relates more particularly to the preparation of a laminating fabric for adhesively uniting the components of the composite fabric.

In processes for preparing fabrics of various degrees of stiffness, for use in wearing apparel or other technical or commercial articles, by effecting the coalescence of two or more layers of fabric by operations involving the use of heat and pressure, one of said layers comprises a laminating fabric containing at least some yarns, filaments or fibers of an organic derivative of cellulose and a plasticizer for the organic derivative of cellulose. These laminating fabrics are prepared by applying to a fabric, made of or containing yarns, filaments or fibers of an organic derivative of cellulose, a suitable plasticizer or plasticizing compound in any suitable manner, as by dipping, spraying or padding the plasticizer or plasticizing compound in solution in a volatile organic solvent therefor on to the fabric.

The prior processes for preparing laminating fabrics were not only quite involved since they required the steps of dissolving the plasticizer in a volatile organic solvent therefor, applying the solution of plasticizer to the fabric, and then removing and recovering the volatile solvent by a suitable solvent recovery process, but were also quite expensive because they necessitated the use of relative costly organic solvents and large amounts of plasticizer. Moreover, the organic solvents employed were often of a toxic nature which caused discomfort to the operatives.

Furthermore, in prior processes for preparing laminating fabrics employing a fabric containing organic derivative of cellulose yarns and cellulose yarns, the plasticizer was not only taken up by the organic derivative of cellulose yarns but also by the cellulose yarns. The latter yarns have no affinity for the plasticizers employed in accordance with this invention and therefore the plasticizer was superficially and lightly retained by the same, thus causing the laminating fabric to be greasy to the touch and the outer layers of the composite fabrics made with such laminating fabrics appeared wet and discolored due to the plasticizer of the laminating fabric sweating from the cellulose yarns through the outer layers to the exposed surfaces. Attempts were made to eliminate the excessive greasiness in laminated fabric without destroying the adhesive properties thereof by removing some of the plasticizer. It was found, however, that when the plasticizer was reduced in quantity the layers of the resulting composite fabric did not adhere properly as was evidenced by laundering tests and the ease with which the layers of the composite fabric were separated.

It is accordingly, an important object of this invention to provide a process for preparing an improved laminating fabric which will be free from the above-mentioned and other disadvantages and which will be simple, expeditious and inexpensive in operation, requiring a reduced amount of plasticizer and no costly and toxic organic solvents.

It is also an object of this invention to prepare a laminating fabric containing yarns, filaments or fibers of an organic derivative of cellulose and a plasticizer therefor which is dry to the hand and which will be free from greasiness even after exposure to atmospheric conditions for a long period of time.

Another object of this invention is the preparation of a laminating fabric containing yarns, filaments or fibers of an organic derivative of cellulose and a plasticizer therefor, which may be easily handled or stored and which has enhanced binding power or adhesion when employed in the production of composite fabrics.

A further object of this invention is to prepare improved laminating fabric, suitable for use in the production of composite fabric of any desired degree of increased stiffness, which is dry and not greasy to the touch and which may be put in roll or bolt form and stored for an indefinite period of time without danger of the same sweating out the plasticizer or becoming greasy.

Still another object of this invention is the provision of a laminating fabric which, when employed in the production of composite fabrics, yields a product which will not appear wet and discolored due to the sweating of plasticizer through the outer layers thereof.

Other objects of this invention will appear from the following detailed description.

In accordance with this invention, I prepare a laminating fabric by applying plasticizer to a fabric made of or containing organic derivative of cellulose filaments or fibers, and preferably a fabric containing organic derivative of cellulose filaments or fibers and cellulose filaments or fibers by passing the fabric through a bath containing the plasticizer in the form of an aqueous dispersion or emulsion employing an organic derivative of cellulose as the emulsifying agent until the fabric has received the desired amount of emulsion thereon, the time of treatment being from 1 to 15 minutes. The bath of plasticizer emulsion is preferably maintained at an elevated temperature, the temperature depending upon the plasticizer employed. I have found, however, that for most plasticizers suitable for use in my process a temperature of 50° C. is satisfactory. When the fabric has received the desired amount of plasticizer, it is permitted to cool and may then be put up in roll or bolt form for storage or shipment.

While this invention is particularly applicable in connection with laminating fabrics containing cellulose acetate it may be used with other organic derivatives of cellulose such as cellulose propionate and cellulose butyrate and cellulose ethers such as ethyl cellulose and benzyl cellulose. My process also contemplates the use of fabrics containing mixed esters of cellulose such as, for example, aceto-propionate and cellulose aceto-butyrate, and also fabrics containing synthetic linear polyamide condensation products such as the polyamides derived from amino-acids or from the condensation of diamines with carboxylic acid, e. g. polyhexamethylene adipamide. However, this invention will be described more specifically in connection with cellulosic acetate, and while the acetone-soluble cellulose acetate will generally be employed because of its commercial availability, cellulose acetate of other solubility characteristics may be used in my process.

Any suitable plasticizer may be employed in accordance with my process. For example, in the case where the fabric to be treated contains cellulose acetate there may be employed ethyl paratoluene sulphonamide, monomethyl xylene sulphonamide, dimethyl phthalate, diethyl phthalate, triphenyl phosphate, dibutyl tartrate or mixtures of two or more of these. The amount of plasticizer used will generally be from 50 to 150% based on the weight of the cellulose acetate present in the fabric.

As stated above, the plasticizer is applied to the fabric in the form of an aqueous dispersion or emulsion. This emulsion may be prepared by dissolving a small amount of cellulose acetate or other organic derivative of cellulose, preferably from 0.5 to 1.0% or more, based on the weight of the plasticizer, using heat if necessary or a small amount of active solvent. The cellulose acetate employed as dispersing agent may have any characteristics. For example, it may have any solubility or viscosity characteristics or any acetyl value.

While I prefer to employ cellulose acetate or other organic derivative of cellulose as the sole dispersing agent, other suitable dispersing agents may be employed in combinations therewith such as, for example, soaps, sulphonated fats or oils or salts thereof, e. g. sulphonated castor oil, true sulphonic acids of aliphatic hydrocarbons or alcohols or of fatty acids or salts thereof, the salts and condensation products of amines, particularly amines containing hydroxy, carboxy or other hydrophile groups, with resin and naphthenic acids and higher fatty acids, e. g. ethanolamine and other alkylolamine soaps and amino-alkyl-amides of higher fatty acids.

The fabric employed in accordance with this invention is preferably one containing filaments or fibers of cellulose acetate together with filaments or fibers of a non-thermoplastic compound, more preferably a fabric containing about 25 to 35% of cellulose acetate filaments or fibers and 75 to 65% of non-thermoplastic filaments or fibers. The fabric may be formed by weaving, knitting, knotting or netting the filaments or yarns of the cellulose acetate with filaments or yarns of non-thermoplastic materials into a fabric. The production of the fabric is preferably effected in such a manner that there is a uniform dispersion of the cellulose acetate filaments or yarns through the yarns or filaments of the non-thermoplastic compound. The non-thermoplastic component of the fabric may consist of cotton, regenerated cellulose, linen, etc. In weaving the fabric the cellulose acetate yarns may be arranged to alternate in the warp or in the weft or both in any desired degree to effect the uniform dispersion through the yarns of non-thermoplastic fibers.

Laminating fabric made in accordance with this invention is an improvement over laminating fabrics made in accordance with prior processes. Thus, the laminating fabric of this invention is at all times dry to the touch, does not become greasy and does not discolor the outer layers of the composite fabric. Moreover, the composite fabrics prepared with the laminating fabric made in accordance with the present invention have excellent adhesion. Furthermore, as indicated above the process of the present invention requires the use of less plasticizer than heretofore found necessary. The use of this reduced amount of plasticizer, which is substantially wholly absorbed by the cellulose acetate component of the fabric makes for a better composite fabric, since no plasticizer seeps through on to the outer layer or layers to give the same a wet or oily appearance.

In order to further illustrate my invention, but without being limited thereto the following specific example is given:

*Example*

A fabric formed by weaving 35% cellulose acetate yarns with 65% cotton yarns is passed through a bath containing an aqueous dispersion or emulsion of dimethoxy ethyl phthalate, containing cellulose acetate as the emulsifying agent in an amount equal to 0.5%, based on the weight of the dimethoxy ethyl phthalate, heated to a temperature of about 50° C. The time of treatment is so regulated that about 100% on the weight of the cellulose acetate present in the fabric of dimethoxy ethyl phthalate is taken up by the cellulose acetate component of the fabric. The treated fabric is then permitted to cool and finally rolled up into the desired form for storage or shipment.

The laminating fabric may be employed in the formation of composite or laminated fabrics which may be used for any purpose where a slightly stiffened or stiff and/or a more or less impermeable fabric is desired. An important application of such products is wearing apparel which may be formed in whole or in part of fabrics made of or prepared from said laminated or composite fabrics. Thus, collars or cuffs for shirts may be formed entirely of the laminated or composite fabrics. Alternatively, shirts may be made wherein the attached collars, neckbands, cuffs, fronts or bosoms are made of such materials. Hats or parts of hats may likewise be formed of such material as may be the inner or sweat bands of hats, visors for caps, cuffs or gauntlets for gloves, inner linings of cravats, stiffening material used in the inner portion of garments such as coats to help retain the shape thereof, shoes and parts thereof, the head piece of gas masks, etc. Fabrics formed by employing this invention may be used for any industrial or technical purposes where fabric of increased stiffness and/or impermeability is required.

The process of effecting the lamination of the laminating fabric with one or more layers of fabric may be any suitable method as, for instance, the wet method wherein the assembly of superimposed fabrics are wetted with water or steam and then subjected to heat and pressure, the dry method where the assembly of superimposed fabrics are subjected directly to heat and pressure in the absence of liquids, or the solvent method wherein the superimposed layers of fabric are wetted with a liquid or vapor which is a solvent or swelling agent at elevated temperatures for the organic derivative of cellulose. Although any process of effecting the lamination may be employed I prefer to employ a two-step process in which the superimposed articles are first bound together by a dry method of laminating and then the adhesion between the layers is further increased by a wet method of laminating. For instance, the assembly of fabrics bound by the dry method of laminating may be treated with water and then again subjected to heat and pressure. This latter method is more fully disclosed in Patent No. 2,126,830. The laminating fabric of this invention may be employed in any of the assemblies and in any manner described in said patent.

It is to be understood that the foregoing detailed description is given merely by way of illustration and that many variations may be made therein without departing from the spirit of my invention.

Having described my invention, what I desire to secure by Letters Patent is:

1. Process for preparing a laminating fabric, which comprises applying to a fabric containing yarn of a thermoplastic compound, selected from the group consisting of cellulose carboxylic esters, cellulose ethers, mixed carboxylic esters of cellulose and synthetic linear polyamide condensation products and non-thermoplastic yarns, an aqueous dispersion of a plasticizer for said thermoplastic compound, said dispersion containing an organic derivative of cellulose as the sole dispersing agent, whereby there is obtained a laminating fabric free of greasiness and capable, under heat and pressure, of adhesively uniting the components in a composite fabric.

2. Process for preparing a laminating fabric, which comprises applying to a fabric containing yarns of a cellulose carboxylic ester and cellulose yarns an equeous dispersion of a plasticizer for the cellulose carboxylic ester, said dispersion containing a cellulose carboxylic ester as the sole dispersing agent for said plasticizer, whereby there is obtained a laminating fabric free of greasiness and capable, under heat and pressure, of adhesively uniting the components in a composite fabric.

3. Process for preparing a laminating fabric, which comprises applying to a fabric containing yarns of cellulose acetate and cellulose yarns an aqueous dispersion of a plasticizer for the cellulose acetate, said dispersion containing cellulose acetate as the sole dispersing agent for said plasticizer, whereby there is obtained a laminating fabric free of greasiness and capable, under heat and pressure, of adhesively uniting the components in a composite fabric.

4. Process for preparing a laminating fabric, which comprises applying to a fabric containing yarns of a cellulose carboxylic ester and cellulose yarns an aqueous dispersion of a plasticizer for the cellulose carboxylic ester yarns and from 0.5 to 1.0%, based on the weight of the plasticizer, of a cellulose carboxylic ester as the dispersing agent for said plasticizer, whereby there is obtained a laminating fabric free of greasiness and capable, under heat and pressure, of adhesively uniting the components in a composite fabric.

5. Process for preparing a laminating fabric, which comprises applying to a fabric containing yarns of cellulose acetate and cellulose yarns an aqueous dispersion of a plasticizer for the cellulose acetate yarns and from 0.5 to 1.0%, based on the weight of the plasticizer, of a cellulose acetate as the dispersing agent for said plasticizer, whereby there is obtained a laminating fabric free of greasiness and capable, under heat and pressure, of adhesively uniting the components in a composite fabric.

WILLIAM WHITEHEAD.